May 3, 1938.  S. JAY  2,115,928
EGG POACHER
Filed Feb. 11, 1937
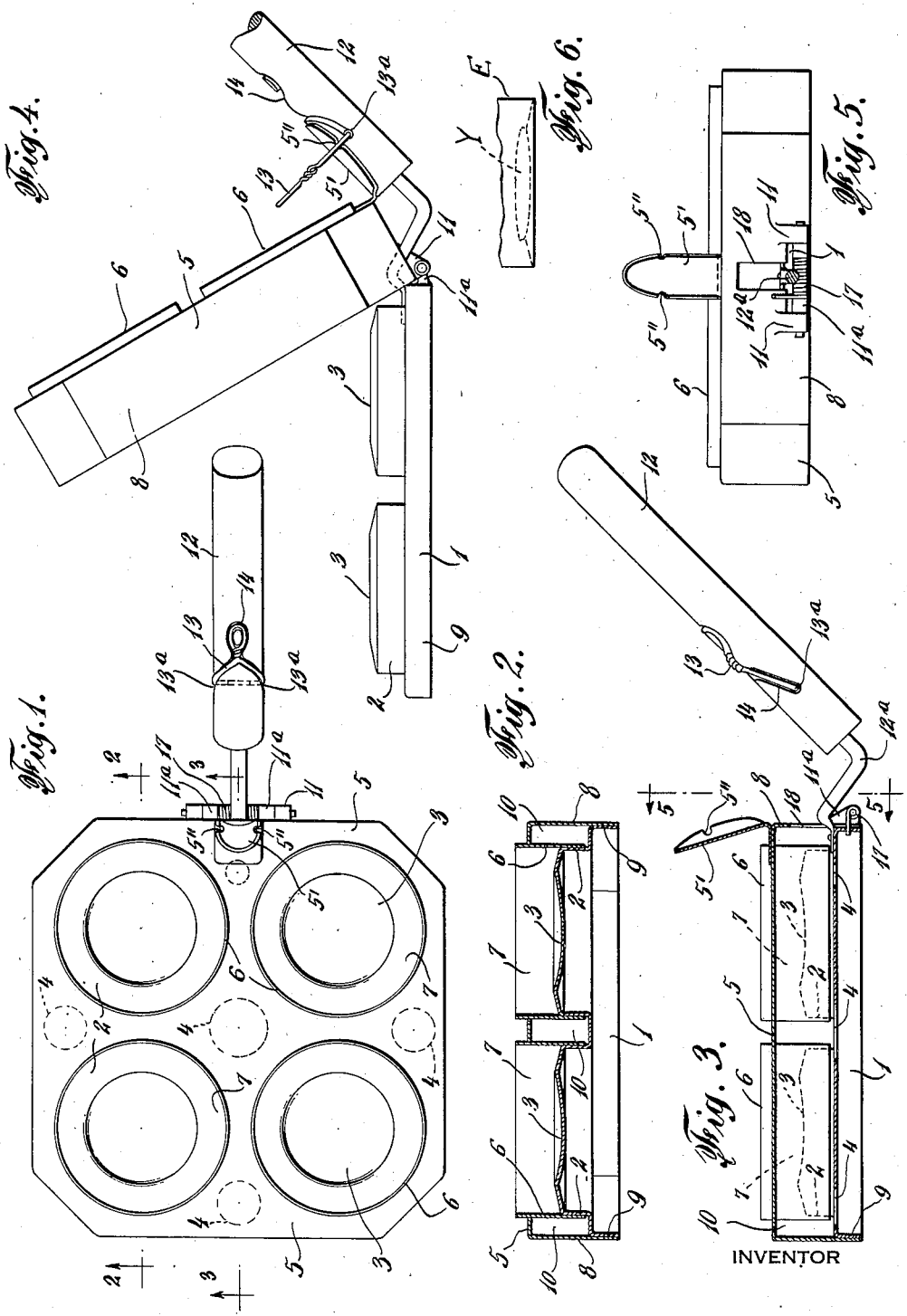
INVENTOR
Samuel Jay Patented May 3, 1938

2,115,928

UNITED STATES PATENT OFFICE 2,115,928

EGG POACHER

Samuel Jay, New York, N. Y.

Application February 11, 1937, Serial No. 125,293

3 Claims. (Cl. 53—1)

I do hereby declare the following to be a full, clear and exact description of the invention. Others skilled in the art of domestic cooking utensils will be able to make and use the same.

An object of my invention is to provide an egg poacher that may be used for poaching any number of eggs simultaneously.

A further object is to provide non-perforated plates for eggs for the purpose of preventing any loss through escapement.

Another object is to provide a new lifting and holding device on the supporting handle so that the eggs after being poached may be easily and quickly deposited in a suitable receptacle.

A still further object is to provide a watertight circulating means for poaching.

A structure which is a preferred embodiment of my invention is clearly illustrated in the accompanying drawing forming a part of this specification, in which:

Figure 1 is a top plan view of egg poacher in working position.

Figure 2 is a section of egg poacher on line 2—2 of Figure 1.

Figure 3 is a section on line 3—3 of Figure 1 showing water circulating means for poaching.

Figure 4 is a side elevation of my invention in open position.

Figure 5 is a section on line 5—5 of Figure 3 showing in particular the hinging means of the egg poacher.

Figure 6 is a side elevation of an egg after being poached.

In the drawing similar reference characters refer to similar parts throughout the several views.

Referring to the drawing, I have provided a base 1 which is arranged with a marginal laterally extending supporting flange 9 and a series of egg supports 2 in the form of concave portions projecting upwardly from the base in a direction opposite to the supporting flange, the end wall of the concave portions being depressed inwardly, as at 3, for the engagement and retaining eggs therein. The base intermediate the egg supports is provided with openings 4.

A flanged cover member 5 is provided with a series of openings corresponding in number and arrangement to the egg supports of the base, and annular members 6 mounted in the openings adapted to slidably fit over the egg supports with a portion of the annular members extending above the egg supports, and forming therewith substantially water tight egg pots 7 to retain the eggs on the egg supports. Flanged rim 8 of cover 5 is so made as to fit over the flange 9 of base 1. Intermediate flanged ports 6 and flanged rim 8 of cover 5 is a water circulating chamber 10.

In the process of poaching, eggs are broken into egg pots 7 and the egg poacher is set into a suitable receptacle which is filled with boiling water about three-quarters the height of flanged rim 8. The boiling water will circulate through said circulating holes 4 into the circulating chamber 10 and in this manner the egg poaching process will proceed.

In order to remove poached eggs from egg pots 7, I have provided a manual lifting and holding device. This device consists of a curved latch 5' riveted or otherwise mounted on cover 5. Said cover 5, by backward pressure of a thumb on latch 5', turns up on hinge 11 and 11a of base 1 thus engaging said latch with handle 12. Wire clasp 13, pivoted at 13a to handle 12 is swung over latch 5' engaging with suitable cut outs 5'', Figure 4. In normal position wire clasp 13 engages in a groove 14 in the handle 12, this being the case so that there is no danger of hurting one's hand while holding the handle. Spring 17 mounted with hinges 11 and 11a, tends to push the cover in a direction toward the base 1 thus affording a good hold by the wire clasp 13. Slot 18 in cover 5 permits the said cover to pass over shank 12a of handle 12.

In Figure 6 I have shown an egg E which has taken the shape of egg pots 7. The yolk Y has adapted the shape of dent 3 of the egg plates 2.

Having thus described my invention fully and clearly what I claim as new and useful and wish to secure by Letters Patent is:

1. In an egg poaching device, a base arranged with a series of concave egg supports projecting upwardly therefrom, a flanged cover member adapted to be engaged upon the base and having a series of openings therein corresponding in number and arrangement to the egg supports of the base, and annular members fixed in the openings of the cover member adapted to slidably fit on and project above the egg supports to retain eggs on the egg supports.

2. In an egg poaching device, a base plate arranged with a marginal supporting flange, said base plate having a series of concave portions projecting upwardly therefrom in a direction opposite the flange and openings intermediate said concave portions, a flanged cover member hingedly connected to the base plate having a series of openings therein corresponding in number and arrangement to the concave projecting portions of the base plate, and annular members fixed in the cover openings adapted to have a sliding fit with the concave portions of the base plate and in conjunction therewith form substantially water tight egg retaining pots, and said cover and annular members in conjunction with the base and concave portions thereof forming a water circulating passage about the pots in communication with the openings in the base.

3. In an egg poaching device as claimed in claim 2, a spring to urge the cover member to position to engage the base, a handle fixed to the base, and means carried by the cover member and handle adapted to co-operate to retain the cover member in position away from the base.

SAMUEL JAY.